July 14, 1953
M. J. DIAMOND
2,645,341
AMPLIFYING AND TRIGGERING MEANS
FOR MAGNETIC HARDNESS TESTERS
Filed July 12, 1950
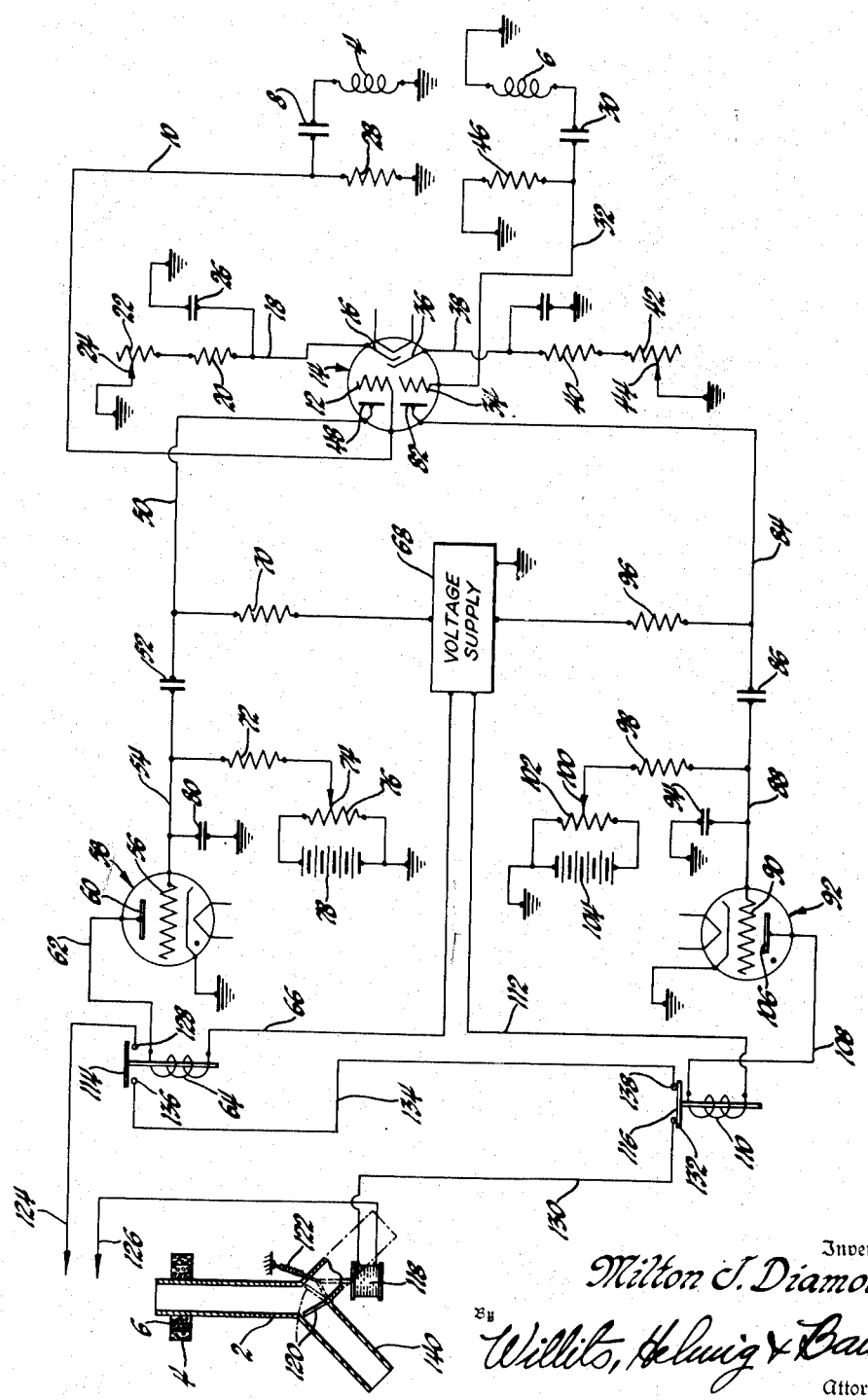
Inventor
Milton J. Diamond
By
Willits, Helwig & Baillio
Attorneys Patented July 14, 1953

2,645,341

UNITED STATES PATENT OFFICE 2,645,341

AMPLIFYING AND TRIGGERING MEANS FOR MAGNETIC HARDNESS TESTERS

Milton J. Diamond, Saginaw, Mich., assignor to General Motors Corporation, Detroit, Mich., a corporation of Delaware Application July 12, 1950, Serial No. 173,457

5 Claims. (Cl. 209—81)

1

This invention relates to testing equipment and more specifically to equipment for testing the physical properties of parts, such for example, as the hardness thereof. Apparatus for quickly and rapidly testing parts for hardness has been designed previously and is the subject matter of my co-pending U. S. application S. N. 95,900, filed May 28, 1949, entitled "Electronic Hardness Tester." In the construction illustrated and shown in that application, parts to be tested are dropped through a tube or chute, magnetized above the saturation point by a very strong magnetic field having sufficient strength to support the parts momentarily, then released and dropped through a pick-up coil in which current is induced by the magnetism retained by the part, which retentivity is proportional to the hardness of the part and the value of the induced current in the pick-up coil after amplification thereof determines the course of the part through the tube or chute to the proper storage means. It is, of course, necessary to have between the inductive pick-up coil and shutter relay operating means for determining the path of the part as it goes to its final distribution point, certain necessary amplifying means to amplify the weak pick-up currents induced in the coil to a sufficient strength to satisfactorily operate the relay means over a predetermined range. It is within this portion of the broad general system previously described that my present invention lies.

In commercially determining the hardness range for a production part there is usually a certain high and low limit set for the particular useability of the part. At either end of this range it is necessary for the apparatus in use to differentiate between parts having only a .1 Brinell diameter difference, and this .1 difference in hardness must induce currents of sufficiently different values so that the selecting mechanism can correctly operate the switching means. Therefore, at one end of the range, let us say the hard end of the range, the mechanism must be capable of detecting the difference between a part having a Brinell hardness diameter of 3.8 from one having a Brinell hardness of 3.9. Then, assuming that approximately a six point range is permitted, this would mean that at the other end of the scale, or the soft end, the mechanism must again differentiate between a part having a Brinell hardness diameter of 4.4 from one having a hardness of 4.5.

In the previous disclosure a single pick-up coil was used, and the output therefrom fed into an amplifier which amplified the voltage obtained.

2

The output of the amplifier was fed into two control trigger tubes which were biased to conduct at different levels, and in turn actuated a pair of relays causing switching means to control the shutter for mechanically diverting the path of the part. In order to obtain a proper separation voltage at each end of the range, so that a sufficient selecting voltage difference will be provided at the hard end of the range, for example between a part having a Brinell hardness of 3.8 and one having 3.9, and also at the soft end of the range, for example between 4.4 and 4.5, considerable experimental work has been done.

It is therefore an object of my present invention to provide means in an electronic hardness testing mechanism to so amplify the induced signals that sufficient strength will be obtained for easy separation at both the high and low limits of the permissible range.

It is a further object of my invention to provide in an electronic hardness tester separate pick-up coils for the high and the low range.

It is a still further object of my invention to provide an amplifier system in which induced currents are amplified and applied in separably adjusted circuits to control means.

With these and other objects in view which will become apparent as the specification proceeds, my invention will be best understood by reference to the following specification and claims and the illustrations in the accompanying drawings, in which:

The figure is a schematic wiring diagram of the pick-up, amplifying and control sections of my selecting means, for the diverting shutter in the chute to ascertain in which direction the parts are to go.

Referring now more particularly to the drawing, there is shown therein a chute 2 through which the part to be tested is dropped. The part as it falls through the tube 2, has been previously magnetized above the saturation point, as shown in the previously referred to co-pending application, and then falls through pick-up coils 4 and 6, which are independently mounted around the tube 2. In the previous case a single pick-up coil was used, the output from which was amplified and later applied to two thermionic tubes operating control relays. However, as previously explained, it is necessary to obtain a sufficient amount of voltage difference at both ends of the range so that proper selection may be made between those just too soft and those that are satisfactory, and just too hard and those that are satisfactory. Since a single induced voltage was previously used, and with that single induced signal voltage it was difficult to obtain satisfactory separation at both ends, applicant has now provided two separate pick-up coils, the signal from one inducing a control voltage used for one relay coil and the signal from the other providing an operating voltage for the other relay coil. Sufficiently strong control signals for separation may be obtained by using a single pick-up coil that is directly connected to two separate adjustable amplifying systems, each controlling a separate trigger tube, but the preferred form is as illustrated.

Pick-up coil 4 therefore is directly connected to a condenser 8, and thence through conductor 10 to one of the control grids 12 of a double triode tube 14. The cathode 16 of this triode section of the tube 14 is connected through line 18 to a resistance 20 and thence on to a second resistance 22 in series therewith. The resistance 22 is of variable value and has an adjustable tap 24 thereon which is connected to ground. A condenser 26 is connected between line 18 and ground. A resistance 28 is connected between line 10 and ground. In a similar manner the pick-up coil 6 is connected to a condenser 30 and thence through line 32 to a control grid 34 of the second triode section of the tube 14. The cathode 36 of this section is connected through line 38 with a resistance 40, which is then connected serially to a second resistance 42. This last resistance is variable and its adjustable tap 44 is connected directly to ground. A resistance 46 is connected between line 32 and ground.

The plate 48 of the first triode section is connected to conductive line 50 which extends to a condenser 52 and thence on through conductor 54 to the control grid 56 of a thermionic control tube 58, of the gas filled or trigger type. The plate 60 or tube 58 is connected through line 62 to one terminal of the relay coil 64, the opposite terminal of which is connected through line 66 to a source of voltage 68. Line 50 is connected with the same source of voltage 68 through a resistor 70. A resistance 72 is connected to line 54 and also to an adjustable tap 74 on a potentiometer 76 across which there is directly connected a source of voltage such as a battery 78, one terminal of which is grounded. A condenser 80 is connected between line 54 and ground.

In similar manner the plate 82 of the second triode section is connected to conductive line 84 which extends to a condenser 86 and thence on through conductive line 88, to the control grid 90 of a further thermionic control tube 92. A condenser 94 is connected between line 88 and ground and a resistor 96 is connected between line 84 and the voltage supply 68. A resistance 98 is connected to line 88 and also to an adjustable tap 100 on a variable resistance or potentiometer 102 across which is connected directly a source of voltage, such for example as battery 104, the negative terminal of which is grounded. The plate 106 of the tube 92 is connected through line 108 to one terminal of a control relay coil 110, the opposite terminal of which is connected through line 112 with the voltage supply 68.

The two relay coils control their armatures 114 and 116 in a reverse manner; that is, armature 114 controlled by relay coil 64 is normally in its open position, as shown, if the relay coil 64 is not energized, and upon energization of the same closes the switch. On other hand, armature 116 in its deenergized position closes the switch contacts, and when relay coil 110 is energized moves to open position. This is known as a normally closed relay while the first is of the normally open type. Both of these relays control the energization of the electromagnet 118 which operates the gate for shutter 120 in the lower portion of the tube 2 to select the parts and send them to the proper bins. The shutter 120 is held in the full-line position by a suitable spring 122 and moves to its opposite position upon energization of the coil 118. The coil 118 receives its power from a pair of incoming lines 124 and 126 which are connected to any suitable source of power. Line 124 is connected directly to stationary contact 128. Line 126 is connected to one terminal of coil 118, the opposite terminal of which is connected through line 130 with stationary contact 132. A conductive line 134 interconnects stationary contacts 136 and 138 which cooperate with armatures 114 and 116 respectively.

In the operation of the system any part which proceeds down tube 2 and is unsatisfactory, either because it is too hard or too soft, is adapted to proceed down the right hand tube projection, as shown, and the shutter 120 remains in position. However, if the part is within the satisfactory limits, then the shutter 120 is actuated and the good or satisfactory part proceeds down the left hand branch or that part designated as 140. When the part falls past the pick-up coils 4 and 6, a voltage is induced therein which is applied to the control grids 12 and 34 of the duo-triode tube and amplified by that particular section. This amplified voltage is then placed upon the control grids 56 and 90 of the thermionic control tubes 58 and 92, respectively, to control the energization of the relay coils 64 and 110. By properly adjusting the amplication in the duo-triode and also that applied to the control grids of the thermionic tubes 58 and 92 through adjustments of the potentiometers 74—76 and 100—102, the tubes 58 and 92 may be made to trigger at such different levels as will properly identify the parts. Since the two paths are entirely separate and independent, they can be properly adjusted to a very fine order as desired.

In the operation of this amplifier system, let it be assumed first that a part has been dropped through the tube 2, which is too soft, and therefore will have too small an amount of retentivity to induce in either coil 4 or 6 a sufficient amount of voltage to operate the system. Relay coils 64 and 110 will not be energized and their armatures will remain in the positions shown, since there is an incomplete system to the solenoid 118 and the shutter will remain in the position shown. This will divert the part into the right hand lower branch and into the unsatisfactory bin. Let it now be assumed that a part has been dropped through the tube 2 which is within the satisfactory range and in that case in falling past coil 4 will induce therein a sufficient amount of current which, when amplified through the corresponding triode section of the tube 14 and applied to the control grid 56 of the thermionic tube 58, will cause it to conduct and energize relay coil 64 and cause it to close its armature 114 bridging the switch points 128—136. The other circuit fed by coil 6 is so adjusted that tube 92 will not conduct and energize relay 110 under these conditions. Since relay 110 is of the normally closed type, the circuit is completed and solenoid 118 energized to pull the shutter 120 to the dotted-line position and divert the part into the left hand channel and into the satisfactory bin.

If, now, the part dropped through were too hard or beyond the range which has been assigned, then in dropping past coil 6 a sufficient voltage will be induced therein which, when amplified through its section of the double triode and applied to the control grid 90 of the tube 92, will cause it to conduct to energize relay coil 110. This then opens switch 116 to prevent a completion of a circuit for the solenoid 118 when the armature 114 closes. Therefore, even though switch 114 tends to complete the circuit and energization of the solenoid 118, switch 116 immediately opens the same and prevents the solenoid 118 from operating. Thus a part which is beyond the range and is too hard will likewise be diverted into the unsatisfactory bin. The only time that the solenoid 118 can operate to pull the shutter 120 to the other position is when the part is within the satisfactory range and relay 64 is energized and relay 110 is not. In order to determine the exact points at which the relays 64 and 110 operate, a very fine adjustment can be made on either tube 58 or 92 through the various adjustable points indicated. In this manner any point can be selected in the system at which the tubes trigger when the device calls for a particular application and in spreading the high and low trigger points and independently and individually amplifying these, very selective points of operation can be found and the selectivity of the system is of the highest order.

I claim:

1. In a testing means, means for moving a magnetized part along a predetermined path, a plurality of juxtaposed inductive coils adjacent said path and in which coils a voltage having a magnitude proportional to the hardness of said part is induced simultaneously by the passage of said part through said path, separate amplifying means connected to each coil and responsive to different levels of voltage induced in said coils, diverting selecting means in the path of said part to determine their destination, relay means to actuate the selecting means, and relay switching means connected to said relay means and including a plurality of relay coils individually connected to the output circuit of each amplifying means, one of said relay coils actuating said relay switching means to energize said relay means when the voltage in said pick-up coils is above a predetermined magnitude and the other of said relay coils actuating said relay switching means to deenergize said relay means when the voltage in said pick-up coils is above another magnitude, whereby the magnetized part inducing a voltage within a range between said magnitudes will be directed to a single point.

2. In means for testing the characteristics of magnetizable parts moving along a predetermined path, electromagnetic activated diverting shutter means in said path to determine the ultimate destination of said parts, a plurality of juxtaposed pick-up coils adjacent said path ahead of the shutter means and in which coils a voltage is induced simultaneously by the passage of said parts through said path, and a separate switching means connected to each of said pick-up coils and to the said circuit of the diverting shutter means, means for actuating one of said switching means for positioning said shutter means when the voltage induced in said pick-up coils is above a predetermined value, and means for actuating the other of said switching means to prevent said shutter means from being so positioned when the voltage induced in said pick-up coils is above another value, whereby a part inducing a voltage within a range between said values will be directed to a single point.

3. In means for testing the characteristics of magnetizable parts moving along a predetermined path, a source of power, electromagnetic diverting shutter means in the path to determine the ultimate destination of said parts, a plurality of juxtaposed pick-up coils adjacent said path and in which coils voltages are simultaneously induced by the passage of said parts through said path, amplifying means connected to each of said coils, separate biasing means of different value for each of said amplifying means whereby each of said amplifying means is responsive to different levels of voltage induced in said coils, switching means in the output circuit of each of said amplifying means, and conductive means serially connecting the electromagnetic diverting shutter means, said source of power and each of the switching means, means for closing the switching means in the output circuit of one of said amplifying means to energize said shutter means from said source of power when the bias and the voltage induced in the pick-up coil connected to said one of said amplifiers are above a predetermined magnitude, and means for causing the switching means in the output circuit of the other one of said amplifying means to prevent said shutter means from being energized from said source of power when the bias and the voltage induced in the pick-up coil connected to said other one of said amplifying means are above another magnitude.

4. In means for testing the characteristics of magnetizable parts, means for moving said parts along a predetermined path, electromagnetic diverting shutter means in the path to determine the ultimate destination of parts, a plurality of juxtaposed pick-up coils adjacent said path and in which coils voltages are simultaneously induced by the passage of said parts, a multistage amplifier connected to each pick-up coil, separate biasing means for each of said amplifiers each biasing means having a different value whereby each of said amplifiers is responsive to different levels of voltage induced in said coils, separate relay switching means connected to the output circuit of each amplifier, a source of power and conductive means connecting said source of power, said electromagnetic shutter means, and each of said separate relay switching means in series circuit, means responsive to one of said amplifiers and acting on the relay switching means in the output circuit of said one of said amplifiers to close said series circuit whereby said shutter means is energized from said source of power when the bias voltage and the voltage induced in the pick-up coil connected to said one of said amplifiers are above a predetermined magnitude, and means responsive to the other one of said amplifiers and acting on the relay switching means in the output circuit of said other one of said amplifiers to open said series circuit whereby said shutter means is prevented from being energized from said source of power when the bias voltage and the voltage induced in the pick-up coil connected to said other one of said amplifiers are above a predetermined level.

5. In testing means in which a magnetized part moves along a predetermined path a plurality of juxtaposed pick-up coils mounted adjacent said path and in which coils voltage is simultaneously induced by the passage of said parts, separate amplifying means connected to each pick-up coil, a gas-filled trigger tube connected to the output circuit of each amplifying means, biasing means for each trigger tube to determine its conductive level, each biasing means providing a biasing voltage of different value, separate relay means in the output circuit of each trigger tube, and electromagnetic selecting means connected to each of said relay means in series circuit and positioned in the path of the parts to determine their destination, means responsive to one of said trigger tubes and acting on the relay means in the output circuit of said one of said trigger tubes to close said series circuit when the bias voltage and the amplified induced voltage applied to said one of said trigger tubes are above a predetermined value, and means responsive to the other one of said trigger tubes and acting on the relay means in the output circuit of said other one of said trigger tubes to open said series circuit when the bias voltage and the amplified induced voltage applied to said other one of said trigger tubes are above another value.

MILTON J. DIAMOND.

References Cited in the file of this patent

UNITED STATES PATENTS

| Number | Name | Date |
| --- | --- | --- |
| 2,045,769 | Geffcken | June 30, 1936 |
| 2,312,357 | Odquist | Mar. 2, 1943 |
| 2,444,751 | Scott | July 6, 1946 |
| 2,504,731 | Rose | Apr. 18, 1950 |
| 2,566,767 | Hunt | Sept. 4, 1951 |

FOREIGN PATENTS

| Number | Country | Date |
| --- | --- | --- |
| 284,307 | Great Britain | Jan. 29, 1929 |